(12) United States Patent
Dickson (10) Patent No.: US 8,276,894 B2
(45) Date of Patent: Oct. 2, 2012

(54) INSULATOR FOR A VEHICLE SUSPENSION SYSTEM

(75) Inventor: Daniel G. Dickson, West Bloomfield, MI (US)

(73) Assignee: BASF Corporation, Florham Park, NJ (US)

( * ) Notice: Subject to any disclaimer, the term of this patent is extended or adjusted under 35 U.S.C. 154(b) by 1100 days.

(21) Appl. No.: 11/943,666

(22) Filed: Nov. 21, 2007

(65) Prior Publication Data
US 2009/0127759 A1 May 21, 2009

(51) Int. Cl.
*B60G 11/36* (2006.01)

(52) U.S. Cl. ......... 267/233; 267/292; 267/116; 267/139

(58) Field of Classification Search ............ 267/116, 267/195, 219, 238, 292, 286, 139; 280/142.145, 280/124.146, 124.147
See application file for complete search history.

(56) References Cited

U.S. PATENT DOCUMENTS

| | | | |
|---|---|---|---|
| 2,822,165 A | 2/1958 | Boschi | |
| 3,037,764 A | 6/1962 | Paulsen | |
| 3,086,792 A | 4/1963 | Schultz | |
| 3,781,033 A * | 12/1973 | Buchwald | 280/6.157 |
| 3,901,494 A * | 8/1975 | Sena | 267/289 |
| 4,738,437 A | 4/1988 | Paton et al. | |
| 4,754,958 A | 7/1988 | Markowski | |
| 4,756,516 A | 7/1988 | Tondato | |
| 4,763,882 A | 8/1988 | Nishlyama et al. | |
| 4,771,989 A | 9/1988 | Smith | |
| 4,779,850 A | 10/1988 | Paton et al. | |
| 4,805,886 A | 2/1989 | Hassan | |
| 5,052,665 A | 10/1991 | Sakuragi | |
| 5,149,069 A | 9/1992 | Hein | |
| 5,232,209 A | 8/1993 | de Fontenay | |
| 5,419,539 A | 5/1995 | Bressler | |
| 5,467,970 A | 11/1995 | Ratu et al. | |
| 5,901,947 A | 5/1999 | Fotino et al. | |
| 6,158,726 A | 12/2000 | Coleman et al. | |
| 6,237,901 B1 | 5/2001 | Bianchi | |
| 6,254,072 B1 | 7/2001 | Bono et al. | |
| 6,276,674 B1 * | 8/2001 | Randell | 267/141.4 |

(Continued)

OTHER PUBLICATIONS

Dickson, Daniel G., "Insulator for a Vehicle Suspension System", U.S. Patent Application filed on this date, 25 pages, Nov. 21, 2007.

*Primary Examiner* — Bradley King
*Assistant Examiner* — Thomas Irvin
(74) *Attorney, Agent, or Firm* — Howard & Howard Attorneys PLLC (57) ABSTRACT

A wheel suspension system for a vehicle includes a mounting base and a striking base spaced from each other and moveable relative to each other along an arced line of motion. An insulator is coupled to and extends from the mounting base. The insulator is formed of an elastomeric material for compression between the mounting base and the striking base when the striking base contacts the insulator during movement of the mounting base and the striking base relative to each other. The insulator is compressed along the arced line of motion between the mounting base and the striking base. The insulator includes an impact portion extending at an acute angle relative to the base plane for distributing compressive forces within the insulator as the insulator is compressed along the arced line of motion. The distribution of the compressive forces within the insulator increases the durability and reliability of the insulator.

19 Claims, 8 Drawing Sheets

U.S. PATENT DOCUMENTS

| | | |
|---|---|---|
| 6,296,237 B1 | 10/2001 | Nagai |
| 6,733,023 B2 | 5/2004 | Remmert et al. |
| 6,857,626 B2 | 2/2005 | Burlage et al. |
| 6,893,011 B2 * | 5/2005 | Schudt et al. ............ 267/220 |
| 7,416,175 B2 * | 8/2008 | Al-Dahhan .............. 267/220 |
| 7,793,922 B2 * | 9/2010 | Hikosaka et al. ......... 267/33 |
| 2002/0063369 A1 | 5/2002 | Huang |
| 2002/0109328 A1 | 8/2002 | Remmert et al. |
| 2004/0075204 A1 | 4/2004 | Heidemann et al. |
| 2005/0012256 A1 | 1/2005 | Huprikar et al. |
| 2005/0230891 A1 * | 10/2005 | Griffin ................... 267/292 |
| 2006/0043659 A1 * | 3/2006 | Gofron et al. ........... 267/220 |
| 2006/0082037 A1 | 4/2006 | Al-Dahhan |
| 2006/0082038 A1 | 4/2006 | Al-Dahhan et al. |
| 2006/0208406 A2 | 9/2006 | Al-Dahhan et al. |
| 2008/0012188 A1 * | 1/2008 | Dickson .................. 267/139 |
| 2009/0127043 A1 * | 5/2009 | Dickson .................. 188/380 |
| 2010/0117276 A1 * | 5/2010 | Okada et al. ............ 267/139 |

* cited by examiner

INSULATOR FOR A VEHICLE SUSPENSION SYSTEM

BACKGROUND OF THE INVENTION

1. Field of the Invention

The present invention relates to an insulator for a wheel suspension system of a vehicle wherein the vehicle includes a mounting base and a striking base with the mounting and striking bases moveable relative to each other along an arced line of motion.

2. Description of the Related Art

Insulators for absorbing loads and dampening vibrations in vehicles are known in the prior art. Such insulators include jounce bumpers for disposition in wheel suspension systems.

The wheel suspension system includes a mounting base and a striking base spaced from and moveable relative to the mounting base. The insulator includes a shoulder portion and an impact portion and the shoulder portion presents a mounting surface for coupling to the mounting base. The impact portion is coupled to the shoulder portion for compression between the mounting base and the striking base when the striking base contacts the impact portion during movement of the mounting base relative to the striking base.

Insulators of these types are formed from elastomeric materials such as rubber or microcellular polyurethane such that the insulator compresses and absorbs loads between the mounting base and the striking base. When the insulator formed of elastomeric material is subjected to compressive forces, the insulator collapses. When the compressive forces are removed from the insulator, the insulator returns to the original shape and thereby regains its form.

Prior art insulators formed of elastomeric materials are designed for linear motion and compression, i.e., the mounting base and the striking base move toward and away from each other along a straight line. In such a configuration, the insulator travels along a straight line and includes a contact surface that is parallel with the striking base so that the insulator collapses linearly and compresses uniformly.

Some wheel suspension systems are arranged such that the mounting base and the striking base move relative to each other in an arced line of motion. In such a system, the insulator is compressed in the arced line of motion. In a twist axle suspension system, i.e., a live axle, the insulator is compressed in the arced line of motion. Other examples wherein the insulator is compressed in the arced line of motion includes when the insulator is mounted to a control arm or to a leaf spring. Insulators of the prior art can lack durability when subject to such compression along the arced line of motion. When moving along the arced line of motion, the insulator contacts the striker surface angularly. As such, upon contact with the striker surface, a portion of the insulator disposed on the interior of the arced line of motion is in compression and a portion of the insulator disposed on the exterior of the arced line of motion is in tension. The compression of the portion disposed on the interior of the arced line of motion is nonuniform, i.e., compression varies across the portion, and such nonuniform compression causes the portion on the interior of the arced line of motion to bulge. Additionally, tension in the portion of the insulator on the exterior of the arced line of motion is destructive to the elastomeric material by causing the elastomeric material to crack or tear.

Accordingly, it would be desirable to manufacture an insulator formed of elastomeric material that is configured to be more durable and reliable than insulators contemplated in the prior art when mounted in a wheel suspension system including a mounting base and a striking base that move relative to each other in an arced line of motion. Specifically, it would be desirable to manufacture an insulator that is designed to reduce or eliminate nonuniform compression and tension in the insulator.

SUMMARY OF THE INVENTION AND ADVANTAGES

The present invention is an insulator for a wheel suspension system of a vehicle. The wheel suspension system includes a mounting base and a striking base. The mounting and striking bases are moveable relative to each other along an arced line of motion. The insulator includes a shoulder portion and an impact portion. The shoulder portion presents a mounting surface defining a mounting plane for coupling to the mounting base. The impact portion is coupled to the shoulder portion. The impact portion is formed of an elastomeric material for compression between the mounting base and the striking base when the striking base contacts the impact portion during movement of the mounting base relative to the striking base. The impact portion extends at an acute angle relative to the mounting plane for distributing compressive forces within the impact portion.

Accordingly, the compressive forces are distributed within the impact portion when the impact portion is compressed along the arced line of motion. As such, the insulator uniformly compresses when subject to compressive forces along the arced line of motion thereby increasing the durability and reliability of the insulator. In other words, the uniform compression eliminates bulging, which is caused by nonuniform compression in the impact portion, and eliminates cracking and tearing, which is caused by tension in the impact portion.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like parts throughout the several views a wheel suspension system 20 for a vehicle is generally shown. The wheel suspension system 20 includes a mounting base 22 and a striking base 24 spaced from and moveable relative to the mounting base 22. The mounting and striking bases 22, 24 are, for example, mounted to mounting protrusions 21 of the vehicle. An insulator 26 is coupled to and extends from the mounting base 22. The insulator 26 compresses between the mounting base 22 and the striking base 24 when the striking base 24 contacts the insulator 26 during the movement of the mounting base 22 relative to the striking base 24. For example, the mounting base 22 and the striking base 24 may move relative to each other when the vehicle drives over an uneven driving surface. Those skilled in the art may also refer to such an insulator 26 as a jounce bumper.

The striking and mounting bases 24, 22 are moveable relative to each other along an arced line of motion A. Types of wheel suspension systems 20 that include mounting and striking bases 22, 24 that are moveable relative to each other along an arced line of motion are known to those skilled in the art. Examples of such types of wheel suspension systems include a twist axle suspension system, i.e., a live axle suspension system, an independent suspension system, and wheel suspension systems including the insulator 26 mounted to a control arm or to a leaf spring of the vehicle.

As shown in FIGS. 3 and 6-10, the wheel suspension system 20 may include a coil spring 28 extending between the mounting and striking bases 22, 24. For illustrative purposes, the coil spring 28 is shown in phantom. The mounting base 22 and the striking base 24 each include a spring seat 30 with the coil spring 28 extending between the spring seats 30. A spring isolator 32 is coupled to the mounting base 22. The coil spring 28 rests on the spring isolator 32 and the spring isolator 32 absorbs vibration and force delivered by the coil spring 28 to the mounting base 22.

The mounting base 22 includes a cup 34. The cup 34 has a support surface 36 and a ring 38 extending from the support surface 36. The ring 38 presents a distal rim 40 spaced from the support surface 36. The support surface 36 and the ring 38 define a pocket 42 and the pocket 42 receives the insulator 26. The cup 34 defines a plurality of tabs 44 disposed about the ring 38 and extending into the pocket 42 toward the insulator 26. The tabs 44 engage the insulator 26 to retain the insulator 26 in the pocket 42. Alternatively, the cup 34 defines a continuous flange for engaging the insulator 26 to retain the insulator 26 in the pocket 42. In any event, it should be appreciated that the insulator 26 can be retained in the pocket 42 in any fashion without departing from the nature of the present invention. The mounting base 22 is formed of a polymeric material such as nylon, isoprene, polypropylene, or polyurethane. More specifically, the mounting base 22 is formed of thermoplastic polyurethane. Alternatively, the mounting base 22 is formed of metal such as steel. However, it should be appreciated that the mounting base 22 may be formed of any material without departing from the nature of the present invention.

The insulator 26 includes a shoulder portion 46 and an impact portion 48 coupled to the shoulder portion 46. The shoulder portion 46 is coupled to the mounting base 22. Specifically, the tabs 44 engage the shoulder portion 46. The shoulder portion 46 is cylindrical and the pocket 42 of the cup 34 is cylindrical.

As best shown in FIGS. 1-2 and 4-5, the shoulder portion 46 presents a mounting surface 50 for coupling to the mounting base 22. As best shown in FIGS. 3 and 6-9, the mounting surface 50 defines a mounting plane 52. The mounting surface 50 of the shoulder portion 46 and the support surface 36 of the cup 34 are planar and the mounting surface 50 abuts the support surface 36. The shoulder portion 46 extends perpendicularly relative to the mounting plane 52.

The mounting base 22 presents a base surface 54 defining a base plane 56. As shown in FIGS. 3 and 6-10, the spring seat 30 presents the base surface 54. In the configuration shown in the Figures, the base surface 54 presented by the spring seat 30 is planar. It should be appreciated that the base surface 54 need not be a continuous planar surface but does extend along the base plane 56. In any event, the base plane 56 moves along the arced line of motion A when the striking and mounting bases 24, 22 move relative to each other along the arced line of motion A. The shoulder portion 46 extends perpendicularly relative to the base plane 56.

The impact portion 48 is coupled to and extends from the shoulder portion 46. The impact portion 48 compresses between the mounting base 22 and the striking base 24 when the striking base 24 initially contacts the impact portion 48 during movement of the mounting base 22 relative to the striking base 24. The impact portion presents a contact surface 57 spaced from the shoulder portion 46. The striking base 24 contacts the contact surface 57 when the impact portion 48 is compressed between the mounting base 22 and the striking base 24.

The impact portion 48 includes a plurality of ring portions 58 spaced from each other and integrally extending circumferentially about the impact portion 48. In other words, each of the ring portions 58 and the impact portion 48 are formed as a unit. For example, the ring portions 58 and the impact portion 48 may be initially formed from a common material. Each of the ring portions 58 respectively extend along a plurality of ring planes 60. A valley 62 is defined between each consecutive pair of annular rings 38. The valleys 62 are concave and extend circumferentially about the impact portion 48. The rings portions 58 and valleys 62 control and guide the compression of the impact portion 48 such that the impact portion 48 uniformly collapses during compression. In other words, the ring portions 58 and valleys 62 aid in preventing bulging and/or bending of the impact portion 48 during compression.

Figure 3:
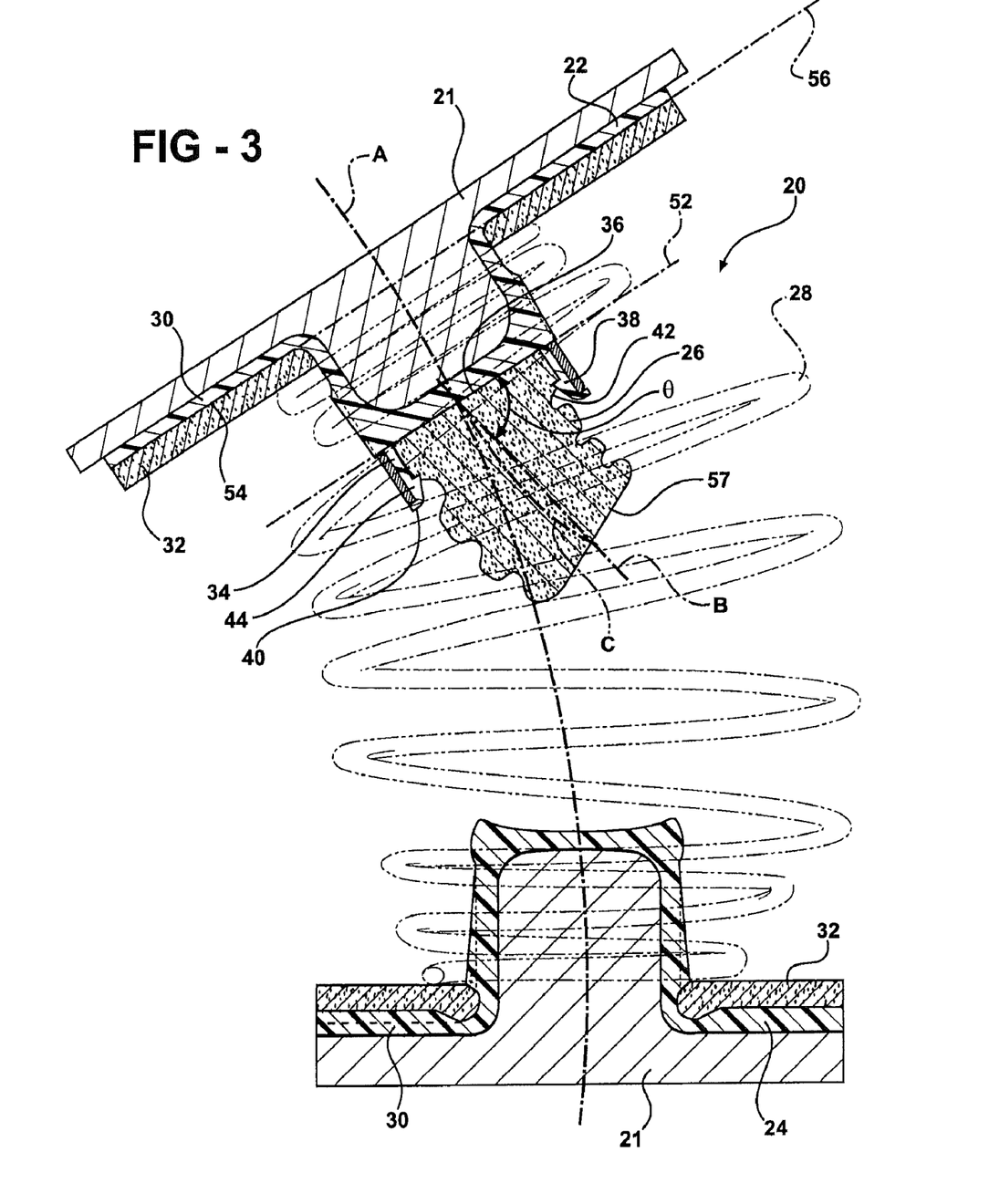
FIG. 3 is a cross-sectional view of an embodiment of a wheel suspension system including the insulator of FIG. 1.
Figure 6:
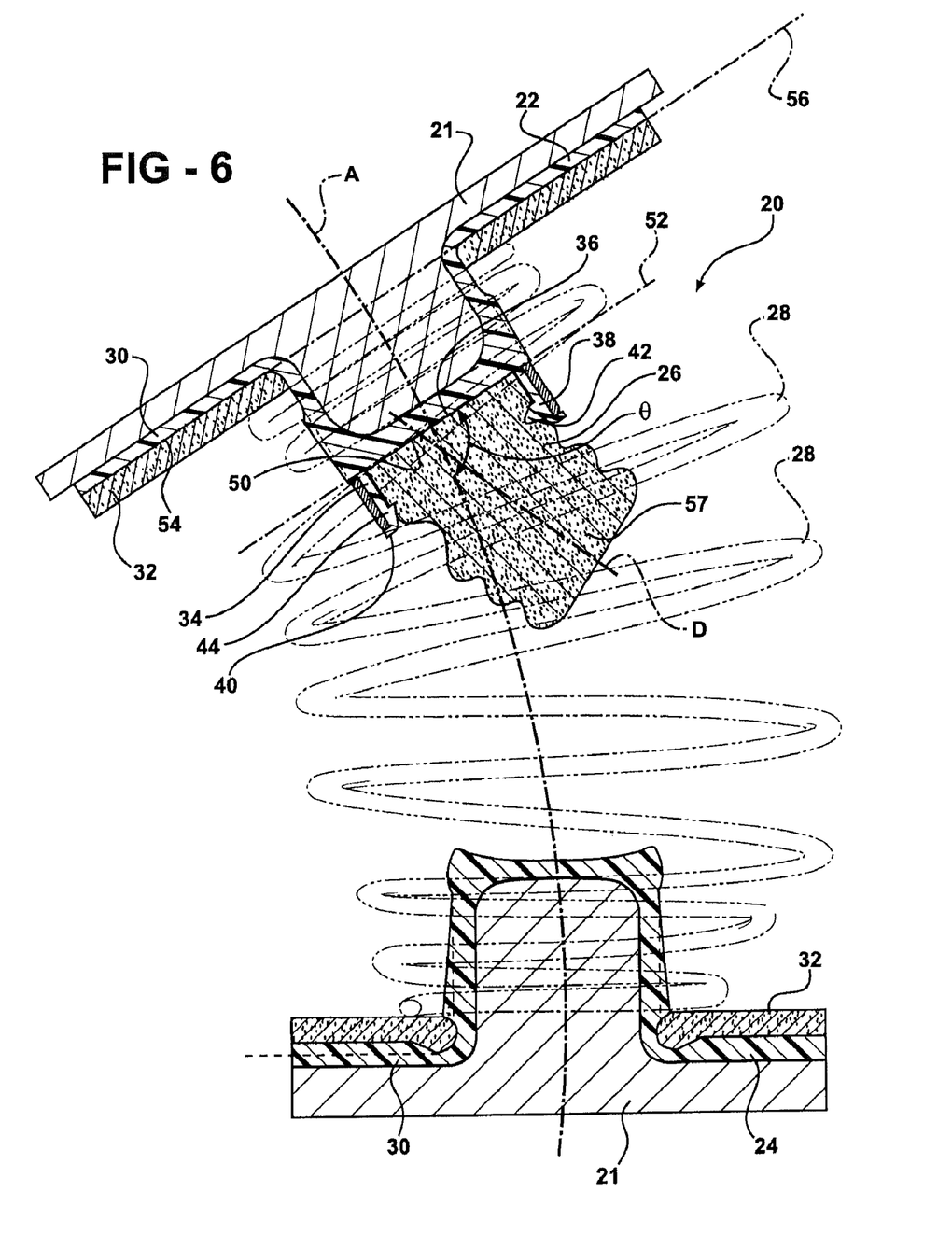
FIG. 6 is a cross-sectional view of another embodiment of the wheel suspension system including the insulator of FIG. 4.
Figure 10:
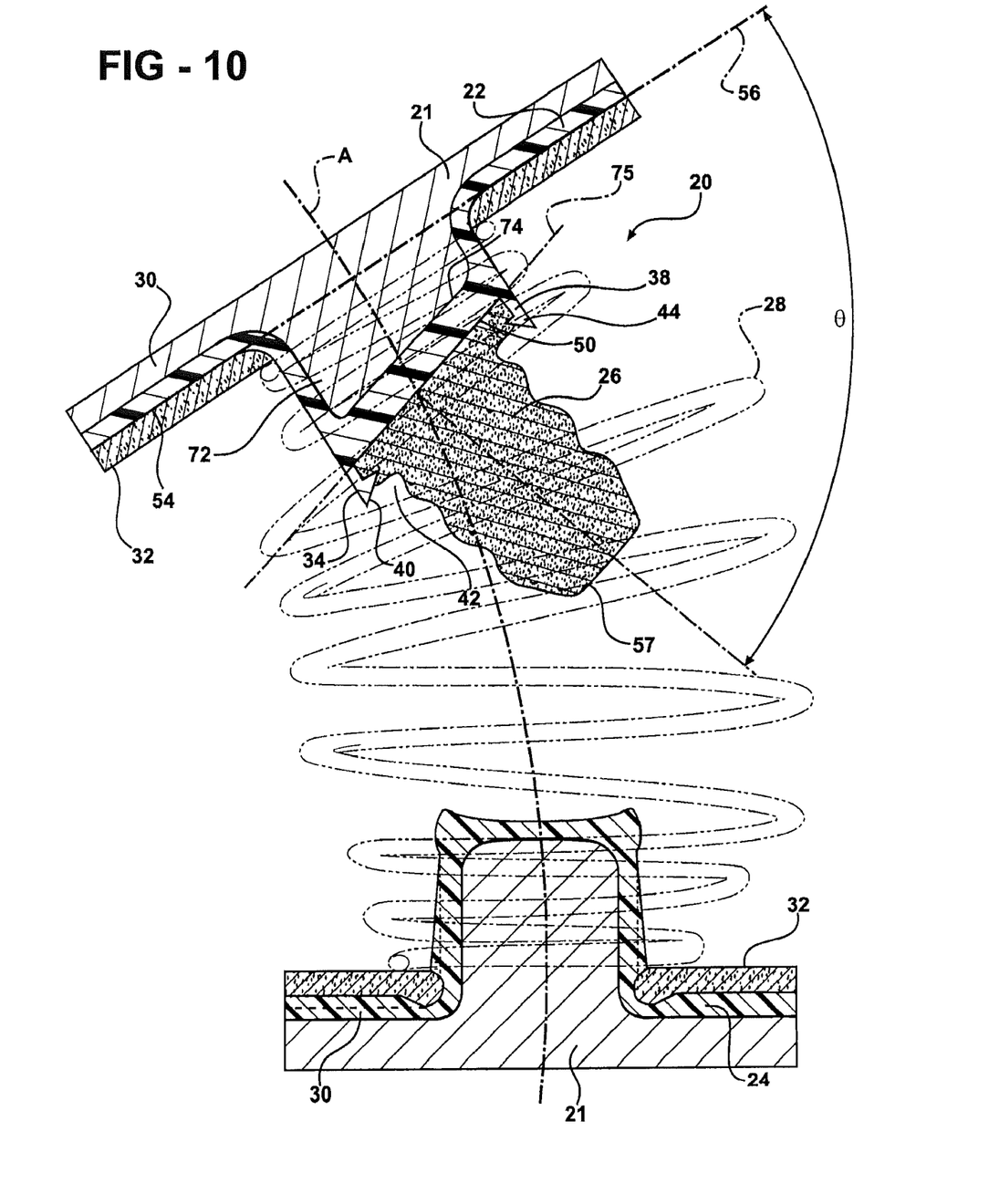
FIG. 10 is a cross-sectional view of another embodiment of the wheel suspension system including a wedged mounting base.

The impact portion 48 extends at an acute angle $\theta$ relative to the base plane 56 for distributing compressive forces within the insulator 26. In other words, because the mounting base 22 and the striking base 24 move relative to each other along the arced line of motion A, an insulator of the prior art is nonuniformly compressed between the mounting base 22 and the striking base 24. The extension of the impact portion 48 at the acute angle $\theta$ relative to the base plane 56 achieves an even distribution of compressive forces in the insulator 26 thereby improving the reliability and durability of the insulator 26. As best shown in FIGS. 3, 6, and 10, the impact portion 48 extends away from the arc line of motion A. In other words, the acute angle $\theta$ is measured from the impact portion 48 to the base plane 56 toward the outside of the arc line of motion A.

The acute angle $\theta$ of the impact portion 48 may have a magnitude dependent upon the arc line of motion A. As such, the magnitude of the acute angle $\theta$ may vary by design. For example, the acute angle $\theta$ may be greater than 0 and less than 75 degrees. However, it should be appreciated that the acute angle $\theta$ may have any magnitude less than 90 degrees without departing from the nature of the present invention.

Specifically, with the insulator of the prior art, upon contact with the striking base, a portion of the insulator disposed on the interior of the arced line of motion is compressed and a portion of the insulator disposed on the exterior of the arced line of motion is subject to tension. As such, the nonuniform compression causes the portion on the interior of the arced line of motion to bulge and the tension causes the portion on the exterior of the arced line of motion to crack and/or tear. With the insulator 26 of the present invention, the extension of the impact portion 48 along the acute angle θ relative to the base plane 56 achieves even distribution of the compressive forces such that the compression of the portion on the interior is decreased and the tension of the portion of the exterior is decreased. As a result, the extension of the impact portion 48 along the acute angle θ reduces or eliminates the bulging of the portion of the interior and the cracking and/or tearing of the portion of the exterior.

As will be discussed below, in the embodiments shown in FIGS. 1-9, the impact portion 48 extends from the shoulder portion 46 at the acute angle θ relative to the mounting plane 52 for distributing compressive forces within the impact portion 48. In the embodiment shown in FIG. 10, the support surface 36 of the cup 34 extends at the acute angle θ relative to the mounting plane 52 such that the impact portion 48 extends at the acute angle θ relative to the mounting plane 52.

Figure 1:
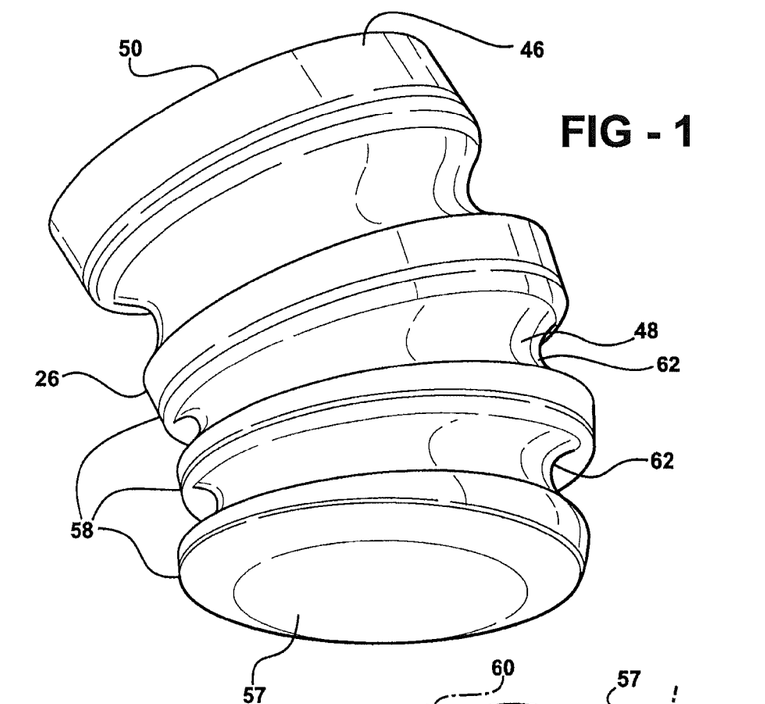
FIG. 1 is a perspective view of an embodiment of an insulator.
Figure 2:
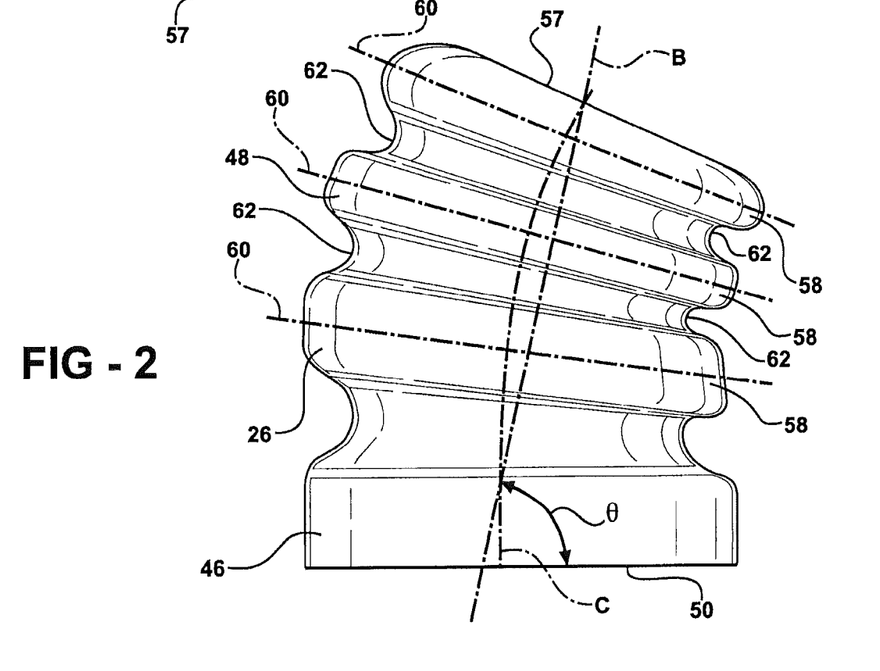
FIG. 2 is a side view of the insulator of FIG. 1.

In the embodiment shown in FIGS. 1-3, the impact portion 48 is curvilinear. Specifically, the impact portion 48 is coupled to and extends from the shoulder portion 46 and presents the contact surface 57 spaced from the shoulder portion 46. The impact portion 48 extends curvilinearly from the shoulder portion 46 to the contact surface 57. As best shown in FIG. 2, a straight line B extending between a center of the impact portion 48 adjacent the shoulder portion 46 and a center of the impact portion 48 at the contact surface 57 extends at the acute angle θ relative to the mounting surface 50, thus extending at the acute angle θ relative to the mounting plane 52.

In such an embodiment, each of the ring planes 60 extend angularly relative to the base plane 56 and relative to the mounting surface 50. Specifically, an angle of each ring plane 60 relative to the base plane 56 is progressively larger than the angle of each ring plane 60 spaced therefrom toward the shoulder portion 46. More specifically, the impact portion 48 extends along a curved axis C and each ring plane 60 extends normal to the curved axis C.

In the embodiment shown in FIGS. 1-3, the shoulder and impact portions 46, 48 are integral with each other. In other words, the shoulder and impact portions 46, 48 are formed as a single continuous unit, i.e., a one-piece insulator 26. For example, the shoulder and impact portions 46, 48 are initially formed together from a common material. Alternatively, the shoulder and impact portions 46, 48 are formed separately from each other and subsequently attached to one another by bonding, adhering, or melting.

Figure 4:
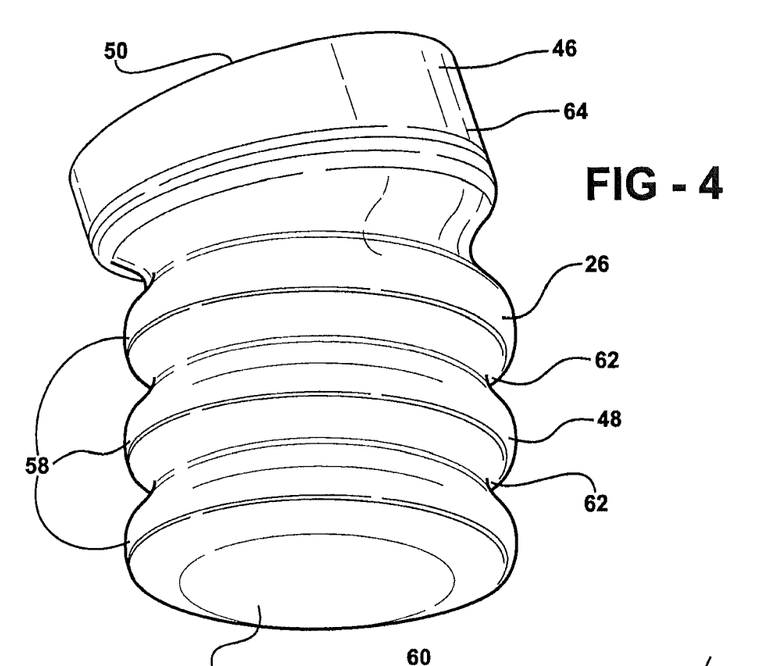
FIG. 4 is a perspective view of another embodiment of the insulator.
Figure 5:
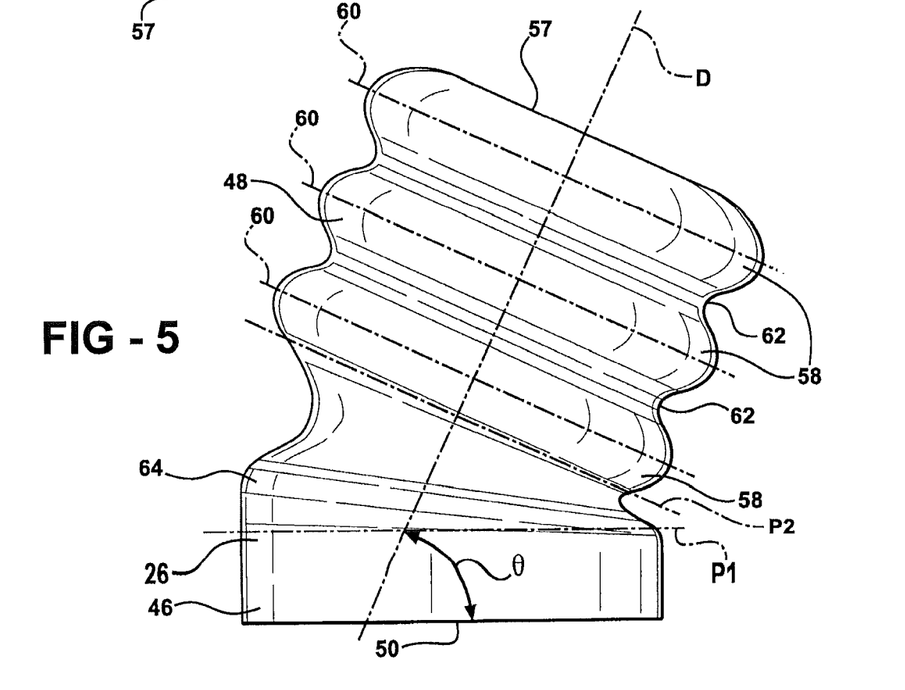
FIG. 5 is a side view of the insulator of FIG. 4.

In the embodiment as shown in FIGS. 4-6, the insulator 26 includes a wedge portion 64 disposed between the shoulder and impact portions 46, 48. The wedge portion 64 extends between a first plane P1 and a second plane P2. The first plane P1 is adjacent to the shoulder portion 46 and extends in parallel with the base plane 56. The second plane P2 is adjacent to the impact portion 48 and extends angularly relative to the base plane 56. In other words, the first plane P1 extends in parallel with the mounting plane 52 and the second plane P2 extends angularly relative to the mounting plane 52.

In such an embodiment, the impact portion 48 extends perpendicularly to the second plane P2. Specifically, the impact portion 48 extends along a straight axis D from the second plane P2 of the wedge portion 64 to the contact surface 57.

The wedge portion 64 is integral with the shoulder and impact portions 46, 48. In other words, the wedge portion 64, shoulder portion 46, and impact portion, 48 are formed as a single continuous unit, i.e., a one-piece insulator 26. In the embodiment shown in FIGS. 1-3, the shoulder and impact portions 46, 48 are integral with each other. For example, the wedge portion 64 and the shoulder and impact portions 46, 48 are initially formed together from a common material. Alternatively, the wedge portion 64 and the shoulder and impact portions 46, 48 are formed separately from each other and subsequently attached to one another by bonding, adhering, or melting.

In the embodiment as shown in FIGS. 4-6, each of the ring planes 60 extend in parallel with the second plane P2 of the wedge portion 64. In other words, the ring planes 60 extend perpendicularly to the straight axis D and are spaced from each other along the straight axis D.

Figure 7:
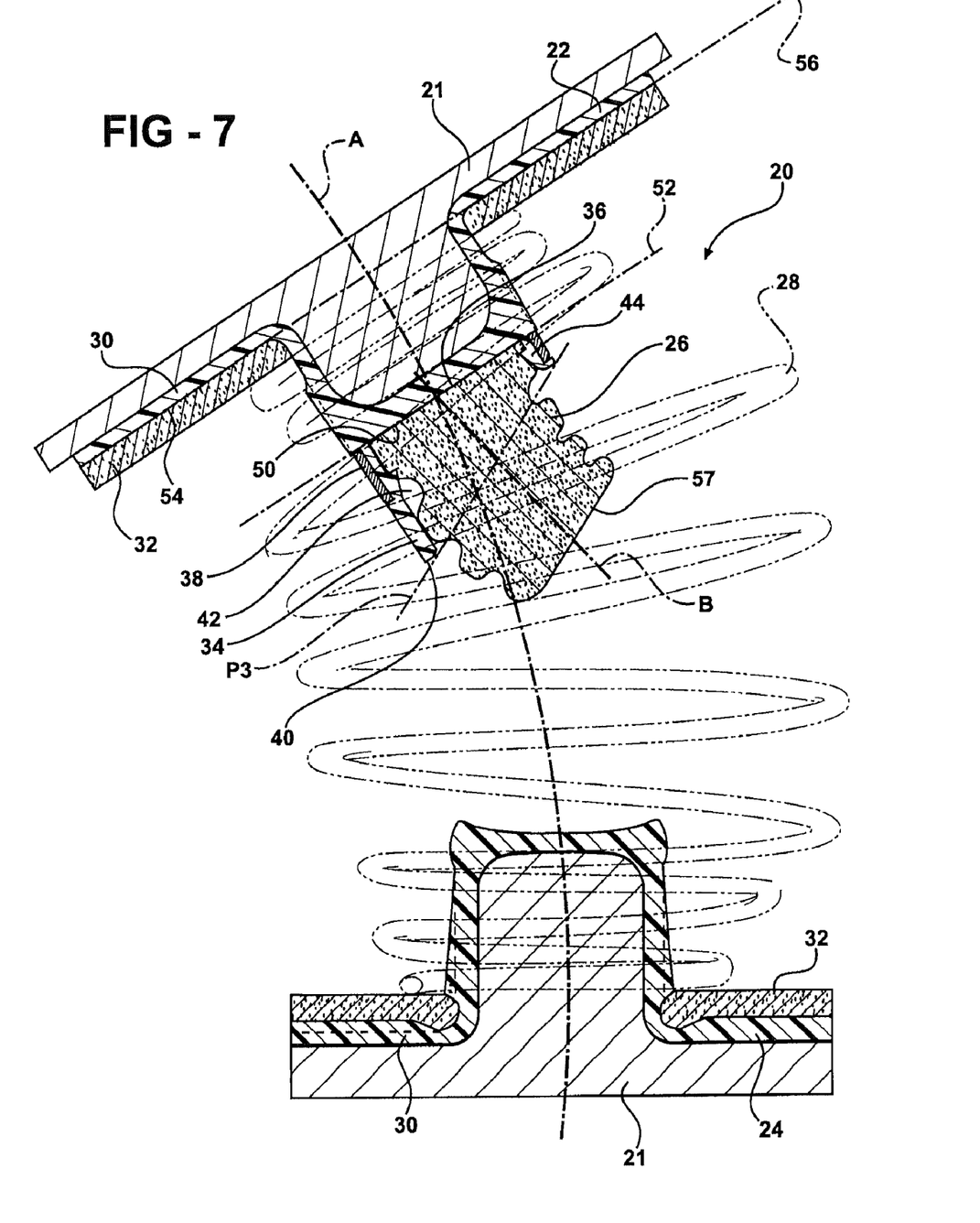
FIG. 7 is a cross-sectional view of another embodiment of the wheel suspension system including an angularly extending rim and the insulator of FIG. 1.
Figure 8:
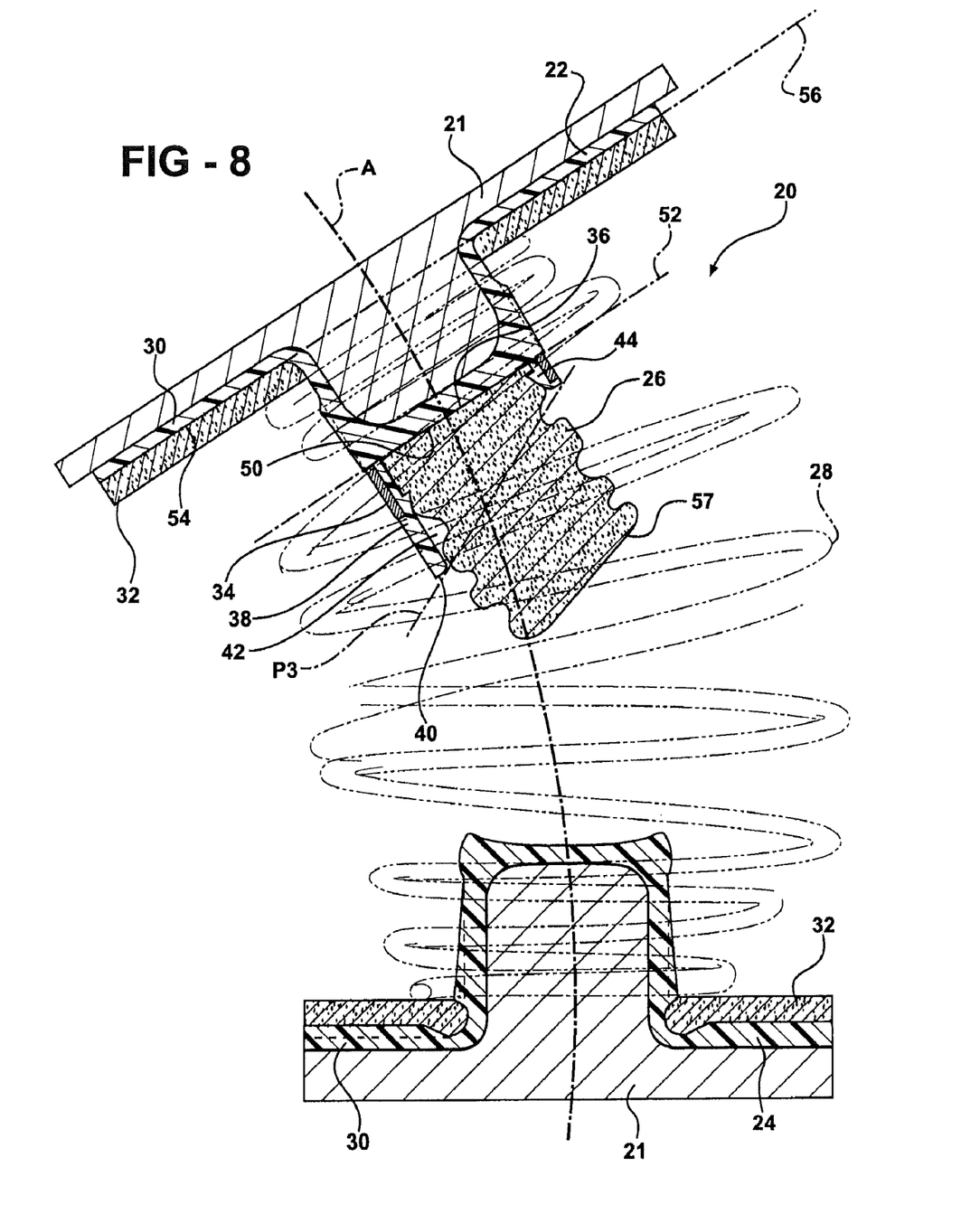
FIG. 8 is a cross-sectional view of another embodiment of the wheel suspension system including the angularly extending rim and the insulator of FIG. 4.

As shown in FIGS. 7-8, the distal rim 40 of the ring 38 extends in a rim plane P3. The rim plane P3 extends angularly with respect to the base plane 56 for guiding the compression of the insulator 26. Specifically, FIG. 7 shows the insulator 26 of FIGS. 1-2 in combination with the distal rim 40 extending along the rim plane P3 angularly with respect to the base plane 56. FIG. 8 shows the insulator 26 of FIGS. 4-5 in combination with the distal rim 40 extending along the rim plane P3 angularly with respect to the base plane 56. Specifically, the taller side of the ring 38 gathers the insulator 26 as the insulator 26 compresses and guides the insulator 26 so that the insulator 26 compresses uniformly.

Figure 9:
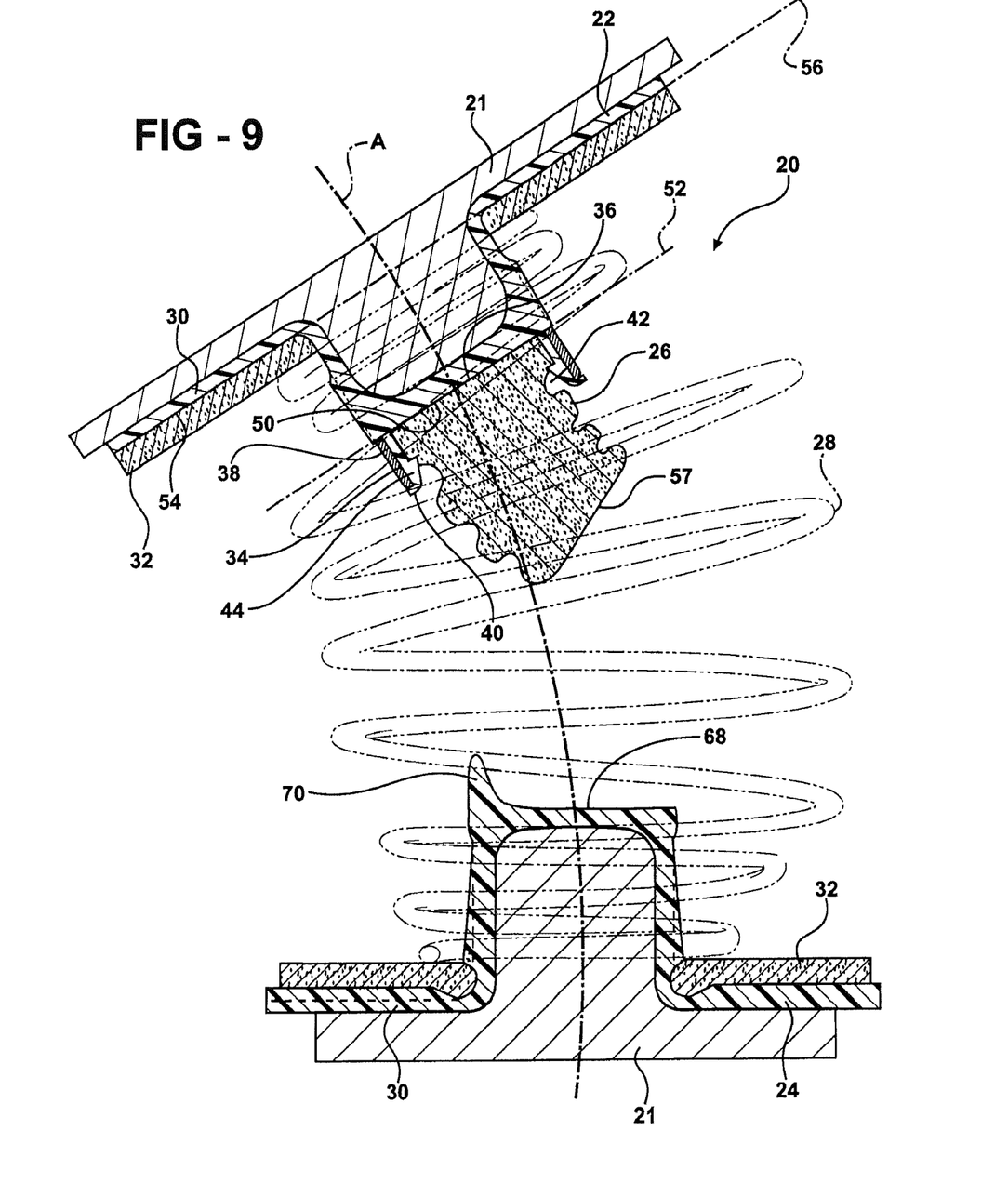
FIG. 9 is a cross-sectional view of another embodiment of the wheel suspension system including a lip on a striking base.

As shown in FIG. 9, the striking base 24 includes a planar strike surface 68 for contacting the insulator 26. A lip 70 extends from the planar strike surface 68 for guiding the compression of the insulator 26. FIG. 9 shows the insulator 26 of FIGS. 1-2 in combination with the striking base 24 having the lip 70. However, it should be appreciated that any type of insulator including the insulator 26 of FIGS. 4-5 can be assembled in combination with the striking base 24 having the lip 70. The lip 70 gathers the insulator 26 and guides the insulator 26 toward the uniform compression into the ring 38.

In another embodiment as shown in FIG. 10, the mounting base 22 includes a base wedge 72 presenting a wedge surface 74. Specifically, the wedge surface 74 is further defined as the support surface 36 and the wedge surface 74 supports the shoulder portion 46 of the insulator 26. The wedge surface 74 defines a wedge plane 75 extending angularly relative to the base plane. The base wedge 72 is integral with the mounting base 22, i.e., the base wedge 72 is integral with the cup 34.

Such an embodiment includes the insulator 26 having the shoulder portion 46 and the impact portion 48 each extending along a common straight axis, i.e., the shoulder portion 46 and the impact portion 48 extend perpendicularly to the wedge plane 75. Specifically, the shoulder portion 46 and the impact portion 48 extend along the common straight axis from the wedge surface 74 to the contact surface 57. The impact portion 48 extends along the common straight axis from the shoulder to the contact surface 57.

The insulator 26 is formed of an elastomeric material. Specifically, the insulator 26 is formed of microcellular polyurethane (MCU). MCU provides several advantages over alternative materials. Specifically, MCU has a microcellular structure, i.e., the MCU presents cell walls defining cells, or void space. When not subject to compressive forces, the cell walls have an original shape and the cells are generally filled with air. When the insulator 26 formed of MCU is subjected to compressive forces, the cell walls are collapsed and air evacuates from the cells and the insulator 26 is thereby deformed. When the compressive forces are removed from the insulator, the cell walls return to the original shape and the insulator 26 thereby regains its form. Because the cell walls collapse when subject to compressive forces, the insulator 26 experiences minimal bulge when compressed. In addition, at relatively low loads the insulator 26 compresses and absorbs loads, i.e. the MCU has a progressive load deflection curve, i.e., characteristic. Because the cell walls are collapsing, as the load increases, the insulator 26 becomes less compressible. When the cell walls are completely collapsed, the insulator 26 is not compressible and thereby provides a block height.

Prior art insulators formed of MCU are designed for linear motion and compression, i.e., the mounting base and the striking base move toward and away from each other along a straight line. In such a configuration, the insulator travels along a straight line and includes a contact surface that is parallel with the striking base so that the insulator collapses linearly and compresses uniformly. When moving along the arced line of motion, the insulator of the prior art contacts the striker surface angularly. As such, upon contact with the striker surface, a portion of the prior art insulator disposed on the interior of the arced line of motion is in compression and a portion of the prior art insulator disposed on the exterior of the arced line of motion is in tension. Nonuniform compression causes the MCU of the portion on the interior of the arced line of motion to bulge. Additionally, tension is destructive to MCU by causing the MCU to crack or tear so that the portion on the exterior of the arced line of motion cracks or tears.

With respect to the insulator 26 of the present invention, because the compressive forces are distributed within the impact portion 48, the insulator 26 uniformly compresses when subject to compressive forces thereby increasing the durability and reliability of the MCU of the insulator 26. In other words, the uniform compression eliminates of the MCU bulging caused by uneven compression in the impact portion 48 and eliminates cracking and tearing of the MCU caused by tension in the impact portion 48.

For example, the MCU is of the type manufactured by BASF Corporation under the tradename Cellasto®. The MCU is formed from a two-step process. In the first step of the process, an isocyanate prepolymer is formed by reacting a polyol and an isocyanate. The polyol is polyester, and alternatively is polyether. The isocyanate is monomeric methyldiphenyl diisocyanate, and alternatively is naphthalene diisocyanate. However, it should be appreciated that the isocyanate can be of any type without departing from the nature of the present invention. In the second step of the process, the isocyanate prepolymer reacts with water to generate carbon dioxide and the carbon dioxide forms the cells of the MCU.

For example, polyester polyols are produced from the reaction of a dicarboxylic acid and a glycol having at least one primary hydroxyl group. For example, dicarboxylic acids that are suitable for producing the polyester polyols are selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. For example, glycols that are suitable for producing the polyester polyols are selected from the group of, but are not limited to, ethylene glycol, butylene glycol, hexanediol, bis(hydroxymethylcyclohexane), 1,4-butanediol, diethylene glycol, 2,2-dimethyl propylene glycol, 1,3-propylene glycol, and combinations thereof. The polyester polyol has a hydroxyl number of from 30 to 130, a nominal functionality of from 1.9 to 2.3, and a nominal molecular weight of from 1000 to 3000. Specific examples of polyester polyols suitable for the subject invention include Pluracol® Series commercially available from BASF Corporation of Florham Park, N.J.

For example, polyether polyols are produced from the cyclic ether propylene oxide, and alternatively ethylene oxide or tetrahydrofuran. Propylene oxide is added to an initiator in the presence of a catalyst to produce the polyester polyol. Polyether polyols are selected from the group of, but are not limited to, polytetramethylene glycol, polyethylene glycol, polypropylene glycol, and combinations thereof. The polyether polyol has a hydroxyl number of from 30 to 130, a nominal functionality of from 1.8 to 2.3, and a nominal molecular weight of from 1000 to 5000. Specific examples of polyether polyols suitable for the subject invention include Pluracol® 858, Pluracol® 538, Pluracol® 220, Pluracol® TP Series, Pluracol® GP Series, and Pluracol® P Series commercially available from BASF Corporation of Florham Park, N.J.

For example, diisocyanates are selected from the group of, but are not limited to 4,4'-diphenylmethane diisocyanate, 2,4'-diphenylmethane diisocyanate, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, and combinations thereof. Specific examples of diisocyanates suitable for the subject invention include Lupranate® 5143, Lupranate® MM103, and Lupranate® R2500U commercially available from BASF Corporation of Florham Park, N.J.

The monomeric methyldiphenyl diisocyanate is selected from the group of 4,4'-diphenylmethane diisocyanate, 2,4'-diphenylmethane diisocyanate, and combinations thereof. Specific examples of monomeric methyldiphenyl diisocyanates suitable for the subject invention include Lupranate® M and Lupranate® MS commercially available from BASF Corporation of Florham Park, N.J. The monomeric methyldiphenyl diisocyante may also be modified with carbonimide. Specific examples of carbonimide-modified monomeric methyldiphenyl diisocyante include Lupranate® 5143 and Lupranate® MM103 commercially available from BASF Corporation of Florham Park, N.J.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A wheel suspension system for a vehicle, said wheel suspension system comprising:
   a mounting base presenting a base surface defining a base plane;
   a striking base spaced from said mounting base with said striking and mounting bases moveable relative to each other along an arced line of motion; and
   an insulator integrally formed of microcellular polyurethane with said insulator coupled to and extending from said mounting base for compressing between said mounting base and said striking base when said striking base contacts said insulator during the movement of said mounting base relative to said striking base;

said insulator including a shoulder portion coupled to said mounting base;

said insulator including an impact portion integral with said shoulder portion and extending at an acute angle relative to said base plane for distributing compressive forces within said insulator;

said striking base including a strike surface contacting said insulator during movement of said mounting base relative to said striking base; and said striking base including a lip extending transversely from said striking surface, said lip contacting a portion of a perimeter of said insulator and being spaced from the rest of the perimeter of said insulator when said insulator contacts said striking surface and guiding said insulator during compression of said insulator between said mounting base and said striking base.

2. The wheel suspension system as set forth in claim 1 wherein said impact portion extends from said shoulder portion and presents a contact surface spaced from said shoulder portion with said impact portion extending curvilinearly from said shoulder portion to said contact surface.

3. The wheel suspension system as set forth in claim 2 wherein the impact portion includes a plurality of ring portions spaced from each other and integrally extending circumferentially about said impact portion with each of said rings extending along a plurality of ring planes and with each of said ring planes extending angularly relative to said base plane.

4. The wheel suspension system as set forth in claim 2 wherein said shoulder portion extends perpendicularly relative to said base plane.

5. The wheel suspension system as set forth in claim 1 wherein said insulator includes a wedge portion disposed between said shoulder and impact portions, said wedge portion extending between a first plane and a second plane with said first plane adjacent to said shoulder portion and extending in parallel with said base plane and with said second plane adjacent to said impact portion and extending angularly relative to said base plane.

6. The wheel suspension system as set forth in claim 5 wherein said impact portion extends perpendicularly to said second plane.

7. The wheel suspension system as set forth in claim 5 further including a plurality of ring portions spaced from each other and integrally extending circumferentially about said impact portion with each of said rings extending along a plurality of ring planes and with each of said ring planes extending in parallel with said second plane of said wedge portion.

8. The wheel suspension system as set forth in claim 1 wherein said mounting base includes a base wedge presenting a wedge surface defining a wedge plane extending angularly relative to said base plane.

9. The wheel suspension system as set forth in claim 1 wherein said mounting base includes a cup having a ring presenting a distal rim and defining a pocket receiving said insulator with said distal rim extending along a rim plane and with said rim plane extending angularly with respect to said base plane for guiding the compression of said insulator.

10. The wheel suspension system as set forth in claim 1 wherein said shoulder portion has a diameter greater than a diameter of said impact portion for engaging said mounting base.

11. The wheel suspension system as set forth in claim 1 wherein said insulator includes a concave side and a convex side defined by said shoulder portion extending at said acute angle relative to said base plane, said lip contacting said convex side and spaced from said concave side when said insulator contacts said striking surface.

12. An insulator for a wheel suspension system of a vehicle including a mounting base and a striking base with the mounting and striking bases moveable relative to each other along an arced line of motion, said insulator formed entirely of microcellular polyurethane and comprising:

a shoulder portion presenting a mounting surface defining a mounting plane for coupling to the mounting base;

an impact portion coupled to said shoulder portion for compression between the mounting base and the striking base when the striking base contacts said impact portion during movement of the mounting base relative to the striking base;

said impact portion extending from said shoulder portion at an acute angle relative to said mounting plane for distributing compressive forces within said impact portion; and a plurality of ring portions spaced from each other and extending circumferentially about said impact portion, each ring portion including an exterior surface extending from a valley to an apex extending circumferentially about said impact portion, each apex defining a ring plane extending through said apex with each of said ring planes extending angularly relative to said base plane.

13. The insulator as set forth in claim 12 wherein said impact portion extends from said shoulder portion and presents a contact surface spaced from said shoulder portion and wherein said impact portion extends curvilinearly from said shoulder portion to said contact surface.

14. The insulator as set forth in claim 13 wherein each of said ring planes extend angularly relative to each other and relative to said mounting plane.

15. The insulator as set forth in claim 12 further including a wedge portion disposed between said shoulder and impact portions, said wedge portion extending between a first plane and a second plane with said first plane adjacent to said shoulder portion and extending in parallel with said mounting plane and with said second plane adjacent to said impact portion and extending angularly relative to said mounting plane.

16. The insulator as set forth in claim 15 wherein said impact portion extends perpendicularly to said second plane.

17. The insulator as set forth in claim 15 wherein each of said ring planes extend in parallel with said second plane of said wedge portion.

18. The insulator as set forth in claim 12 wherein said shoulder portion extends perpendicularly to said mounting plane.

19. The insulator as set forth in claim 12 wherein said shoulder portion has a diameter greater than a diameter of said impact portion for engaging said mounting base.

* * * * *